(12) United States Patent
Little et al.

(10) Patent No.: US 6,272,637 B1
(45) Date of Patent: *Aug. 7, 2001

(54) SYSTEMS AND METHODS FOR PROTECTING ACCESS TO ENCRYPTED INFORMATION

(75) Inventors: Wendell L. Little, Denton; Stephen M. Curry, Dallas; Donald W. Loomis, Coppell, all of TX (US)

(73) Assignee: Dallas Semiconductor Corporation, Dallas, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/837,145

(22) Filed: Apr. 14, 1997

(51) Int. Cl.[7] .............................. H04L 9/32; H04L 9/00; H04L 17/02
(52) U.S. Cl. .......................... 713/194; 713/193; 713/200; 380/52
(58) Field of Search ..................... 380/3, 4, 52; 711/166; 713/193, 194

(56) References Cited

U.S. PATENT DOCUMENTS

| | | | |
|---|---|---|---|
| 4,525,599 | * | 6/1985 | Curran et al. .............................. 380/4 |
| 4,750,142 | * | 6/1988 | Akiba et al. .......................... 364/550 |
| 4,795,893 | * | 1/1989 | Ugon ..................................... 713/194 |
| 5,247,564 | * | 9/1993 | Zicker ..................................... 379/40 |
| 5,341,497 | * | 8/1994 | Younger ............................. 364/267.9 |
| 5,357,572 | * | 10/1994 | Bianco et al. .......................... 380/23 |
| 5,514,981 | * | 5/1996 | Tam et al. ............................... 326/80 |
| 5,515,540 | * | 5/1996 | Grider et al. ............................. 380/4 |
| 5,537,055 | * | 7/1996 | Smith et al. .............................. 326/8 |
| 5,600,818 | * | 2/1997 | Weikmann ........................... 711/163 |
| 5,737,604 | * | 4/1998 | Miller et al. .......................... 711/166 |
| 5,784,625 | * | 7/1998 | Walker ................................. 710/260 |
| 6,161,180 | * | 12/2000 | Matyas et al. ....................... 713/169 |

OTHER PUBLICATIONS

Boneh, Dan, Richard A. DeMillo, Richard J. Lipton, Cryptoanalysis in the Presence of Hardware Faults, Sep. 25, 1996.*

IBM Technical Disclosure Bulletin, Identification Card, Jul. 1980, vol. 23, NR 2, pp. 673–675.*

* cited by examiner

*Primary Examiner*—Tod Swann
*Assistant Examiner*—Douglas J. Meislahn
(74) *Attorney, Agent, or Firm*—Jenkens & Gilchrist, A Professional Corportion

(57) ABSTRACT

A microcontroller communicating via a data path and an address path with a memory block containing encrypted contents, the microcontroller including the capability for detecting resets effectuated in the wake of an unauthorized attempt to gain access to the encrypted contents and the capability of evading such an unauthorized attempt.

5 Claims, 6 Drawing Sheets

SYSTEMS AND METHODS FOR PROTECTING ACCESS TO ENCRYPTED INFORMATION

BACKGROUND OF THE INVENTION

1. Field of the Invention

The present invention relates generally to secured microcircuits, and more particularly to a method and apparatus for providing access protection in a microcontroller interfaced with a memory block.

2. Description of the Related Art

Controlling access to program and data information is a highly desirable objective for users in many sensitive applications. One of the more effective methods by which such access control is presently effectuated involves encrypting the program and data information that is stored in a memory block and using a suitable processor circuit to execute the application program in plain-text. Clearly, this approach requires that the processor circuit be able to receive the encrypted program and data bytes from the memory block, decipher the encrypted program and data bytes into plain-text, execute the machine instructions, and subsequently, encrypt the results that need to be written back to the memory block.

It can be appreciated that in the access control approach described above, the electrical signals asserted on the communication paths, that is, data and address buses, between the processor circuit and the memory block are in the encrypted form so as to thwart an unauthorized attempt to gain access to the contents of the memory block. Because the sequential instructions of an ordinary program or data table are stored non-sequentially in the memory block, it would be virtually impossible for an attacker to disassemble op-codes of the program or to convert encrypted program and data information back into their true representation.

To further enhance the security of the user application program during reset and interrupt handling, some improved approaches provide for a "protected" memory area within the processor circuit for storage of reset and interrupt vector locations. The protected memory area may also be capable of storing initial portions of a user application. Moreover, tamper detection circuits, which are also typically provided in these improvements, are designed to generate signals to instantaneously erase the contents of this local memory area along with the contents of encryption keys used for encryption/de-encryption, should there be any unauthorized event such as, for example, micro-probing of the data or address buses.

It should be understood that notwithstanding the aforementioned developments, an encrypted application program may nevertheless be susceptible to being compromised by a persistent attacker who uses a brute "trial and error" approach based on the monitoring of the address and data buses and on the occurrence of such system events as resets.

An exemplary trial and error attack on an encrypted application program may be described as follows. The attacker can monitor the address bus following a reset and stop the data flow from the external memory block at an arbitrary address location, for example, A+0. Beginning at this address, the normal memory field can be replaced with an arbitrary number of bytes, for example, five bytes, supplied from an alternate memory source for addresses A+0 through A+4. Essentially, the idea is to continue to reset the processor circuit and inject different combinations of program bytes at various, "stopped" addresses until an observable change is detected outside the processor circuit, that is, on a port or a serial output pin. This approach focuses on finding an encrypted set of the first three program bytes at locations A+0 through A+2 which would be properly decoded as a three-byte instruction, such as for example the MOV PORT 1, #XX instruction used in a 8051-compatible microcontroller, where #XX is an arbitrary "data" byte that is to be moved to Port 1. The additional two bytes at locations A+3 and A+4 are required to allow time for the processor circuit to finish the transfer of the data (#XX) to the external Port 1 pins.

Once the MOV instruction to Port 1 is found, all variations of the third byte (that is, the #XX data byte) at address A+2 are then evaluated (using 256 resets) to totally decode the encrypted data field at the address A+2 by observing the plain-text data seen on the port. This, in effect, provides a total decryption of the data field at the address location A+2. Once A+2 is decoded, the trial and error method is restarted, but over the range of A+1 through A+6. It may be noted that this approach is somewhat easier for the later passes than the initial pass since the complete decoding for the data at the third byte in the 5-byte sequence (that is, A+2 of the initial sequence) is now known. As a result, the trial and error technique focuses on finding a single byte instruction for the address A+0 and looking for the MOV instruction at A+1. Because the previous decoding of A+2 gives the information required to encode the value of Port 1 address, no trial and error operations are required for this value. Once the MOV instruction and any single byte instruction at location A+0 are determined, it is possible to totally decode the data encryption associated with the contents of the location A+3. A single byte instruction at A+0 may easily be forced by trial and error because majority of the instructions associated with a processor circuit, for example, an 8051-compatible microcontroller, represent single byte instructions.

At this point, a third search is used to find a second single byte instruction for address location A+1. This search is done in connection with the previously determined encryption of A+2 and A+3. This, then, allows the proper decoding of the location A+4 by establishing the MOV Port 1 instruction with the "data" being the contents of A+4. It can be readily appreciated that decrypting A+4 allows all remaining sequential addresses to be directly determined without the need for a trial and error search. Thus, once a small block of an encrypted memory is totally decrypted, an attacker can force the processor circuit to do a total down-load of all encrypted memory locations to a port using MOV instructions.

It can be seen that the exemplary trial and error attack methodology described above is time-intensive and highly probabilistic. However, as can be appreciated, there may be applications where even a remote possibility of exposure cannot be tolerated. It is therefore desirable to have a mechanism to detect any type of unauthorized attempt to gain access to the contents of a memory block and to launch an evasive action that is completely immune to the attack. Furthermore, such a mechanism should be reliable, economically feasible, and yet conservative in execution time requirements.

SUMMARY OF THE INVENTION

In one aspect, the present invention is directed to a system of the type including a first circuit with an internal bus, which first circuit is capable of communicating with a second circuit via a data bus and an address bus, the system comprising means for sensing an unauthorized attempt to access the second circuit; and means for launching an evasive action, responsive to a signal generated by the sensing means. In the presently preferred exemplary embodiment, the second circuit of the system comprises an external memory, and the system further comprises an address path encryptor for encrypting signals asserted on the address bus using the contents of a first encryption key, a data path encryptor for encrypting signals asserted on the data bus using the contents of a second encryption key, and a secure memory block, disposed within the first circuit. In this embodiment, the presently preferred exemplary memory block is coupled to the internal bus. In one alternative embodiment, the sensing means comprises at least a counter for monitoring the number of uncompensated system resets; and at least a memory location for storing a reset threshold value. In a further embodiment, the sensing means comprises a reset-counter register, and a reset-threshold register, wherein each of the registers is coupled to the internal bus.

Additionally, the launching means of the present invention comprises, in one embodiment, a structure for comparing the contents of the counter with the contents of the memory location, and another structure for effectuating a loop within the secure memory block, responsive thereto. In a yet another embodiment, the launching means comprises an access register, coupled to the internal register, a structure for comparing the contents of the reset-counter register with the contents of the reset-threshold register, and a structure for effectuating a loop within the secure memory block, responsive, at least in part, to the contents of the access register.

In another aspect, the present invention relates to a method of protecting access to the encrypted contents of a plurality of memory locations, which memory locations are interfaced with a microcontroller via a data path and an address path, the method comprising the steps of: sensing an imminent attempt to unauthorizedly access the contents of the plurality of memory locations; and responsive to the sensing step, launching an evasive action including an erasure step for erasing the contents of the plurality of memory locations or a step of looping with a secure memory area.

BRIEF DESCRIPTION OF THE DRAWINGS

A more complete understanding of the present invention may be had by reference to the following Detailed Description when taken in conjunction with the accompanying Drawings wherein.

DETAILED DESCRIPTION

Figure 1:
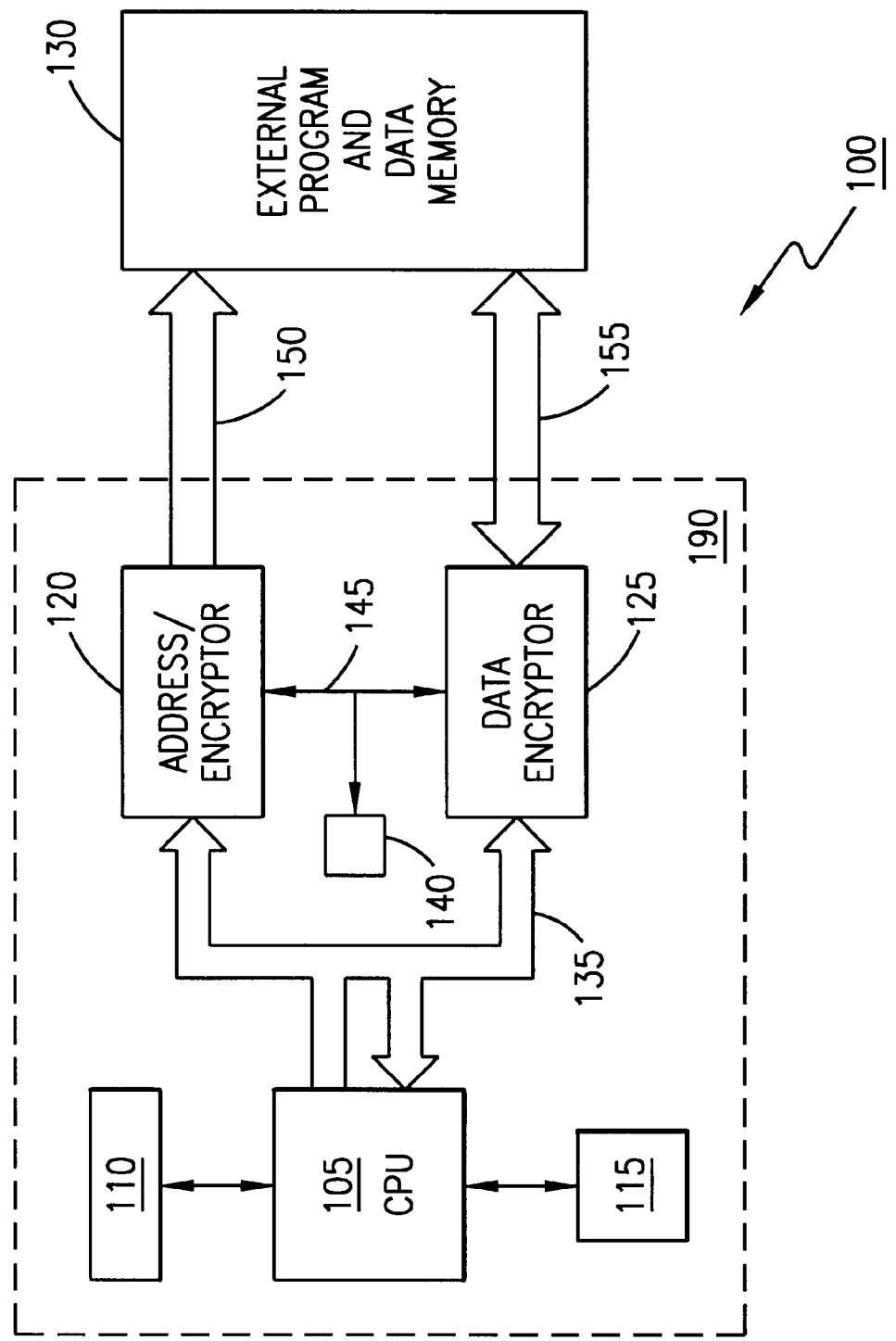
FIG. 1 depicts a block diagram of an integrated circuit with secured data and address paths to a memory block, wherein the teachings of the present invention may be practiced.

Referring now to the Drawings wherein like or similar elements are designated with identical reference numerals throughout the several views, and wherein the various elements depicted are not necessarily drawn to scale, and in particular to FIG. 1, therein is depicted a block diagram, generally at 100, of an integrated circuit 190 with secured data and address paths, reference numerals 155 and 150, respectively, to a memory block 130.

The integrated circuit 190 comprises a processor 105 to which an address path encryptor 120 and a data path encryptor 125 are connected via an internal bus 135. Also, the integrated circuit 190 may comprise a program counter 110 and a port 115. For the purpose of encrypting the address path 150 and the data path 155, an encryption key block 140 may also be provided as a part of the integrated circuit 190. The memory block 130, which may contain both an executable program and data associated therewith, is external to the integrated circuit 190.

In general operation, the integrated circuit 190 may assist in the initial loading of the memory block 130 with program and data information such that the stored information is encrypted or scrambled. However, as can be appreciated by those skilled in the art, it is not a necessary requirement and the integrated circuit 190 is operable with a memory block pre-loaded with scrambled information, provided a suitable encryption key is made available to the integrated circuit 190. In either situation, when the integrated circuit 190 is interfaced with the memory block 130 for the purpose of executing the scrambled program stored in the memory block 130, the signals asserted on the uni-directional address path 150 and the bi-directional data path 155 are in their encrypted form with respect to the encryption key block 140 which may contain either identical or separate keys for both address and data path encryption. Consequently, an intruder seeking to unravel the scrambled contents of the memory block 130 cannot do so by simply monitoring and correlating the logic levels being asserted on the address and data paths 150, 155, respectively.

Figure 2:
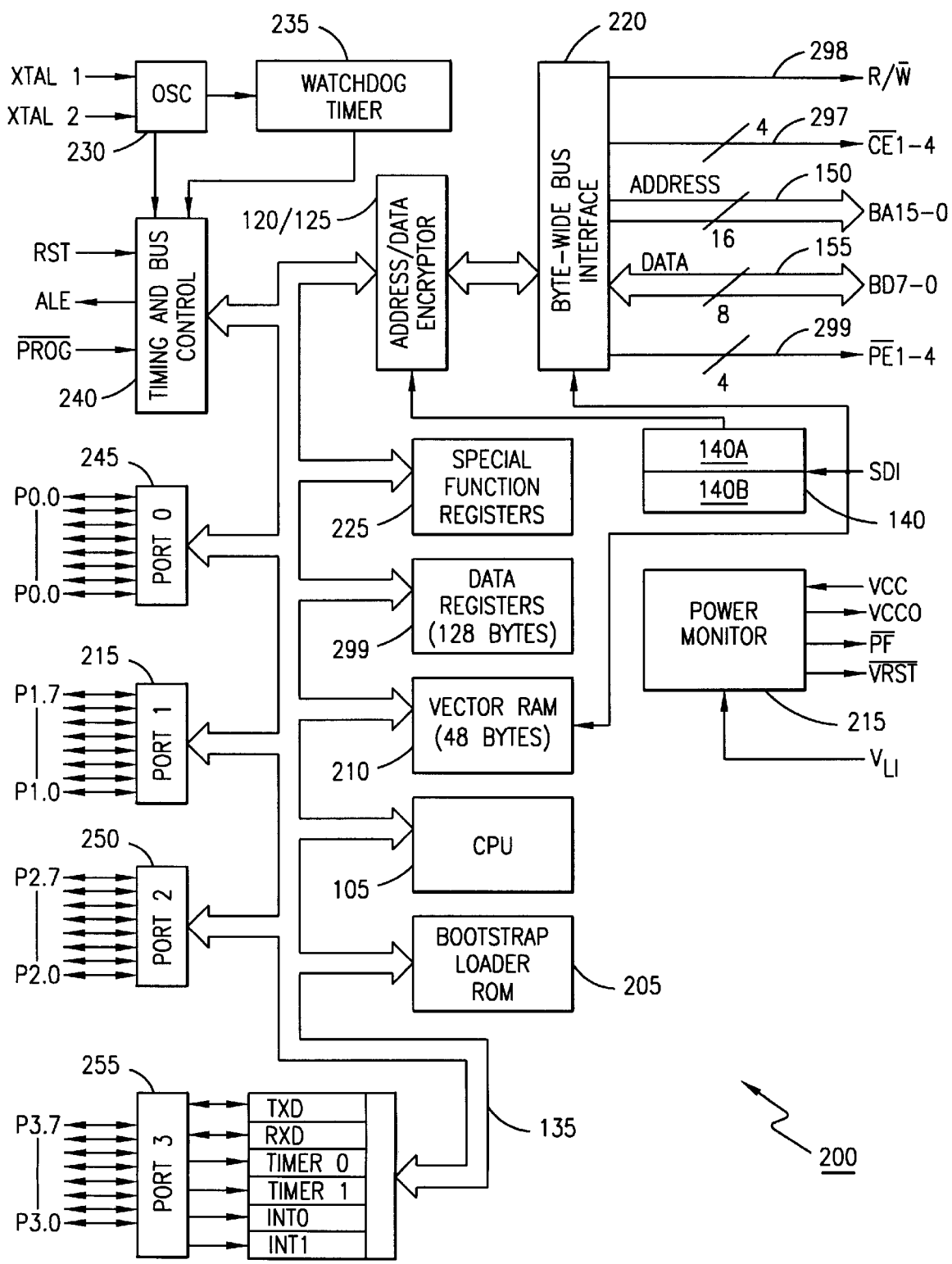
FIG. 2 depicts a block diagram of an exemplary embodiment of a secure microcontroller with address and data path encryption.

Referring now to FIG. 2, depicted therein is a block diagram of a secure microcontroller, generally at 200, with encryption facilities to thwart unauthorized users. It can be readily seen that the secure microcontroller 200 is an exemplary embodiment of the integrated circuit 190 shown in FIG. 1. Since the teachings of the present invention are described in relation to this exemplary embodiment, it is deemed both appropriate and useful to describe the secure microcontroller 200 in greater detail hereinbelow.

Coupled to the internal bus 135 are the processor 105, address/data encryptors 120 and 125, respectively, and a plurality of ports, for example, port 255, port 250, port 215, and port 245. A byte-wide bus interface 220 is connected to address/data encryptors 120/125 such that the address path 150, which is 16-bits wide, and the data path 155, which is 8-bits wide, issue from the bus interface 220. A plurality of "PERIPHERAL ENABLE" signal lines, lines 299, a plurality of "CHIP ENABLE" signals lines, lines 297, and a "READ/WRITE" signal line, line 298, also emanate from the bus interface 220. It can be understood that line 298, lines 297, lines 299, in conjunction with the data path 155 and the address path 150, are used to effectuate an operable interface between the secure microcontroller 200 and an external circuit such as the memory block 130 shown in FIG. 1.

Continuing to refer to FIG. 2, an oscillator block 230 and a watchdog timer block 235 are connected to a timing/bus control block 240 that is in turn interfaced to the internal bus 135. Also connected to the internal bus 135 are a ROM 205 that contains a bootstrap loader program, a vector RAM 210, a block of special functional registers 225 and a scratchpad memory block 299. The encryption key block 140 may comprise two segments, an address encryption key segment 140A and a data encryption key segment 140B. Alternatively, the encryption key block 140 may comprise a single encryption key segment only. The secure microcontroller 200 further includes a power monitor 215 for monitoring and managing various power relationships therein.

Figure 3:
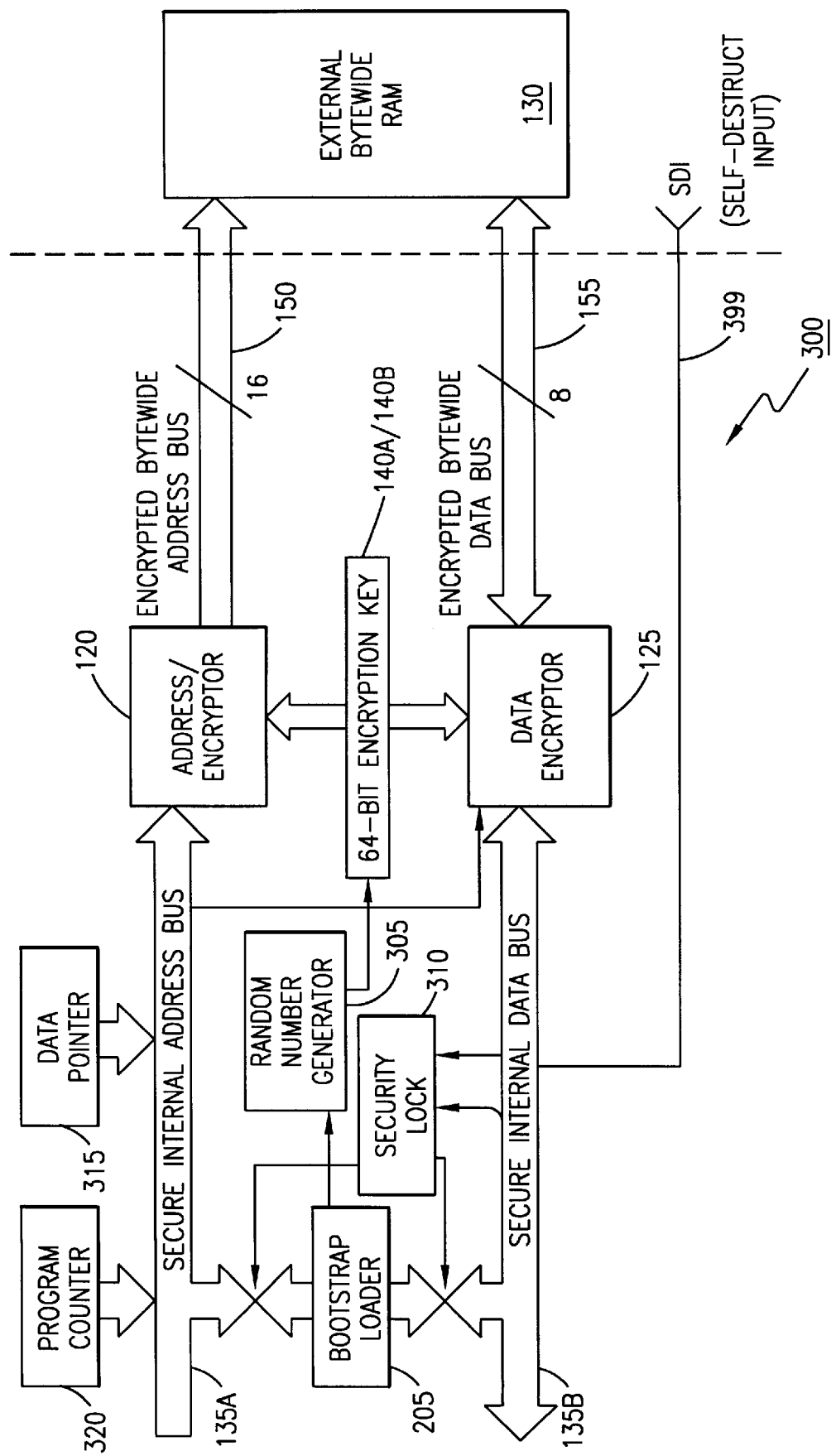
FIG. 3 depicts a block diagram of an exemplary embodiment of encryption circuitry used in the secure microcontroller provided in accordance with the teachings of the present invention.

Referring now to FIG. 3, shown therein is a block diagram of the exemplary encryption circuitry, generally at 300, used in association with the secure microcontroller 200 (shown in FIG. 2). A program counter 320 and a data pointer 315 are interfaced to a segment of the internal bus, internal address bus segment 135A, that is connected to the address encryptor 120. The ROM block 205, containing a bootstrap loader program, is disposed between the internal address segment 135A and another segment of the internal bus, internal data bus segment 135B, that is coupled to the data encryptor 125. The encryption circuitry 300 further includes a random number generator 305 coupled to the bootstrap loader ROM block 205 for generating preferably a 64-bit encryption key 140A/140B that may be used for encrypting for address and data paths 150, 155, respectively. A security lock 310 is provided to deny access to the memory block 130 via the ROM block 205 after a user application program is encoded and loaded in the memory block 130. A "SELF-DESTRUCT" signal line, line 399, is provided for resetting the security lock 310 in response to an external event, for example, an "alarm" signal generated by an external tamper detection circuit. The resetting of the security lock 310 preferably triggers a plurality of events, for example, instantaneous erasure of the contents of the encryption key block 140 and the vector RAM block 210; sequential erasure of the encrypted contents of the memory block 130; and creation of new encryption key contents.

An overview of the secure operation of the microcontroller 200 may now be had taking FIGS. 2 and 3 together. A user application program may be loaded into the external memory block 130 (which, in some embodiments, may comprise conventional non-volatile memory such as static random access memory) via the bootstrap loader program stored in the ROM 205. As can be appreciated, such loading is only possible when the security lock 310 is clear, or de-activated. If the security lock 310 has been previously set for some reason, then it is mandatory to clear it prior to the loading of the user application program. An exemplary manner of loading the application program using the bootstrap loader ROM 205 may be as follows:

(a) clear the security lock 310, if previously set;
(b) generate new encryption keys for segments 140A and 140B;
(c) configure the external memory block 130;
(d) load the application software that has been encrypted;
(e) set the security lock 310; and
(f) exit the bootstrap loader ROM 205.

The user application program is thus loaded (either in parallel or serially) into the external memory block 130 in scrambled (or, encrypted) form because the sequential instructions of an ordinary program or data table are stored non-sequentially in the external memory locations. As will be described hereinbelow in greater detail, the encryption of the program/data information is achieved by the encryption key block 140 and a portion of the address itself such that identical bytes are stored as different values in different external memory locations. It should be clear to those skilled in the art that the contents of the encryption key block 140 are based on a value produced by the random number generator 305 and the key contents loaded by the ROM 205 just prior to the loading of the user application program. In one embodiment, the key contents are retained as non-volatile information in the absence of power by conventional battery back-up circuits.

Encryption logic is essentially segmented into the address encryptor 120 and the data encryptor 125. Although each encryptor uses its own algorithm for encrypting information, both depend on the contents of the encryption key block 140 which may preferably contain a 64-bit key. However, it should be realized that it is also possible to provide two separate encryption keys for the address and data information, respectively. Furthermore, it can be seen that the encryptors 120, 125 operate during both the loading of the user application program and the execution thereof. The address encryptor 120 translates each "logical" address, that is, the normal sequence of addresses that are generated in the logical flow of program execution, into an encrypted address (or, "physical" address) at which the information is actually stored. Each time a logical address is generated, either during the loading of the user application program or during its subsequent execution, the address encryptor 120 uses the contents of the encryption key block 140 and the value of the logical address itself to form the physical address which will be asserted on the lines forming the address path 150. The encryption algorithm is such that there is one and only one physical address for every possible logical address. The address encryptor 120 operates over the entire range of the external memory block 130 whose map is configured during the bootstrap loading.

As the bootstrap loading of the user application program is performed, the data encryptor 125 transforms the op-code and the operand (or, the data byte), if any, at any memory location into an encrypted representation. The data encryption logic uses the contents of the encryption key block 140, the value of the op-code or operand, and the address of the memory location where the encrypted value is going to be stored to form encrypted information which is written to the external memory block 130. To ensure integrity, the encryption algorithm is repeatable such that for a given value, encryption key block contents, and logical address, the encrypted byte will always be the same.

As each byte is read back to the processor 105 during the execution of the user application program, the data encryptor 125 restores it to its original value. When a byte is written to the external memory block 130 during the program execution, that byte is stored in encrypted form as well.

It can be appreciated that when an application program is stored in the manner described in the foregoing, it is virtually impossible to disassemble op-codes or to convert encrypted values (including program and data) back into their true representation. Address encryption has the effect that the op-codes and data are not stored in the contiguous form in which they were assembled, but rather in seemingly random locations in the external memory block 130. As an added protection measure, the address encryptor 120 may also generate "dummy" read access cycles whenever time is available during the execution of the user application program.

To ensure the security of the user application program during reset and interrupt handling, the reset and interrupt vector locations may be incorporated into the on-chip vector RAM block 210 in the secure microcontroller 200. The vector RAM block 210 may be automatically loaded with the user's reset and interrupt vectors during the bootstrap loading. Further, the vector RAM block 210 may be used for storing a small piece of the user code (typically, the first few bytes comprising an initial portion).

It can be appreciated that notwithstanding the aforementioned encryption features for "securitizing" a microcontroller such that a user application program to be executed by that microcontroller virtually remains undecipherable to an unauthorized party, that is, an intruder or attacker, it is certain that the secure microcontroller 200 with the encryption circuitry 300 may nevertheless be prone to a persistent attacker who uses a "trial and error" approach based on the monitoring of the address path 150 and the data path 155 following an attacker-initiated reset. Furthermore, it can be appreciated that although it is extremely unlikely that such an attack will be successful, there may be applications where even such remote possibility of exposure cannot be tolerated. As is discussed immediately below, even such trial and error attacks on a secure microcontroller will be thwarted according to the teachings of the present invention. Principally, once it is determined that an imminent attack on a secure integrated circuit, for example the secure microcontroller 200, is underway, certain countermeasures are undertaken in order to impede the attacker's progress. It should be understood that these countermeasures may be implemented in software or firmware. Moreover, these implementations may be enhanced by utilizing certain hardware structures provided in accordance with the teachings of the present invention.

The countermeasures to a trial and error attack are based on the fact that this approach requires a large number of resets to analyze different bytes at specific address locations in order to find the required instruction (for example, a MOV instruction) and create an observable change on a port, for example, Port 1, of the microcontroller 200. Further, it can be appreciated that the countermeasures provided in accordance with the teachings of the present invention focus on the fact that the microcontroller 200 is reset rarely, if ever, during the normal execution of the encrypted application program. These measures also take advantage of the fact that the attack must wait until the processor 105 is executing instructions outside the vector RAM block 210.

It should be appreciated upon reference hereto that the essential concept of the countermeasures in accordance with the teachings of the present invention is two fold. First, one needs to determine that an attack is imminent by detecting a prespecified number of attack-associated resets which are to be distinguished from the resets that may be generated either in the normal course of application program execution or due to some random, environmental fluctuations such as, for example, a power cycling event. Second, once such a determination is made, an appropriate evasive action must be taken in order to impede the progress of the attacker.

In accordance with the teachings of the present invention, one or more scratchpad SRAM addresses in block 299 (for example, 68 Hex through 7F Hex) may be established as single or multiple "registers" which function as the storage locations for a reset count. Each time the microcontroller 200 begins operation, a section of the code provided in the vector RAM block 210 according to the teachings of the present invention will test whether the contents of the reset counter (or, multiple counters, if so provided) equal a prespecified threshold value which may be initialized either in a scratchpad memory location in block 299 or in an external memory location. As will be seen below, this determination is an entry point to a number of decisions geared to either thwart an attack or to sufficiently discriminate between attack-associated resets and resets due to other causes.

It should be understood that these aspects of the present invention may be exposed to certain undesirable features that may come into existence from time to time. For example, it is possible that the contents of the scratchpad memory of block 299 may be overrun by the user application or the bootstrap loader program in ROM 205, thereby destroying the initial value of a prespecified reset threshold limit. Moreover, the user code may be randomly altered by a runaway code (that is, execution of operands as instructions and vice versa) which also has the potential for corrupting the scratchpad memory 299.

Additionally, the code necessary for discriminating between attack-associated resets and other resets, and for the evasive action that needs to be taken is typically constrained by the size of the vector RAM block 210, which in some embodiments may be as small as 48 bytes. Accordingly, it can be appreciated that certain hardware enhancements provided in accordance with the teachings of the present invention will be very desirable to implement the attack countermeasures discussed in the foregoing.

Figure 4:
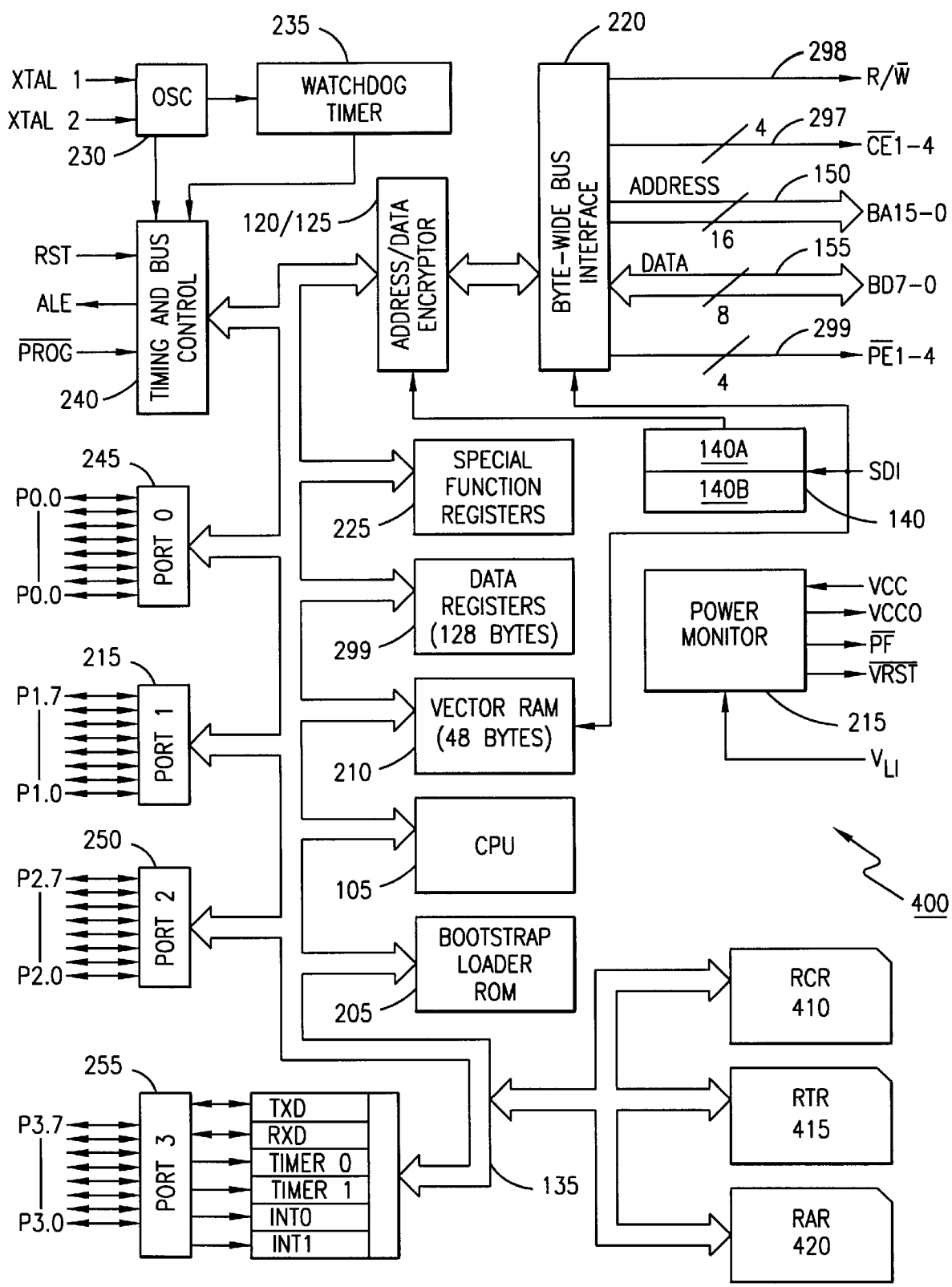
FIG. 4 depicts a block diagram of an exemplary embodiment of a microcontroller with enhanced hardware features in accordance with the teachings of the present invention.

Referring now to FIG. 4, a block diagram of a presently preferred exemplary embodiment of an "enhanced" secure microcontroller 400 is shown. It will be realized that the microcontroller 400 is similar to the microcontroller 200 shown in FIG. 2, including the innovations and improvements according to the teachings of the present invention. A reset-counter-register ("RCR") 410, a reset-threshold-register ("RTR") 415 and a ROM-access-register ("RAR") 420 are provided in the enhanced secure microcontroller 400 such that each of them is coupled to the internal bus 135.

The RCR 410 is provided to keep the count of the resets that are effectuated after a system power-up. The RCR 410 may preferably be implemented as a special function register so that the contents thereof cannot be altered by any interrupt or reset. Further, any write operation to the RCR 410 may preferably be protected by a timed access mechanism such that the probability of randomly writing to the RCR 410 is significantly reduced. As those skilled in the art may readily appreciate, reading from the RCR 410, however, need not be so protected.

As stated in the foregoing, a typical trial and error attack may involve several system resets at the behest of the attacker in order to be able to probe the address and data paths 150, 155. There may be several ways to distinguish between a legitimate reset and a reset pursuant to an imminent attack. Some of the exemplary methods for achieving this objective, depending upon the nature of the user application program and system resources, will be described in reference to FIG. 5 below.

The contents of the RTR 415 signify a reset-associated "threshold"value, the attainment of which triggers a user-specified evasive action, for example, complete erasure of the user application program in the memory block 130. Essentially, the RTR value symbolizes how quickly the user may want to respond against an imminent attack by deploying an evasive action. This value may be loaded by the bootstrap loader code in the bootstrap ROM block 205, preferably when the enhanced secure microcontroller 400 is initially loading the application program. Again, the value in RTR 415 may not be altered by resets or interrupts.

The contents of the RAR 420, which are set at the initial load time, serve multiple purposes in accordance with the teachings of the present invention. The least significant bit (b0) of the RAR 420 is denoted the "ENABLE-ROM- ENTRY" ("ERE") bit. The ERE bit must be set (that is, its value is a binary "1") in order for the system (that is, the enhanced secure microcontroller 400 and an external memory such as, for example, the memory block 130 in FIG. 1, taken together) to enter into the ROM block 205 upon a reset. In accordance with the teachings of the present invention, the contents of the ROM block 205 now relate not only to the bootstrap loader code, but also to a host of decision-making tasks relative to the contents of the RCR 410 and RTR 415, and possible evasive actions including complete erasure of the user application program residing in the memory block 130. In a presently preferred exemplary embodiment of the present invention, the contents of the higher-order bits, for example, b5–b6, of the RAR 420 are used for creating a "menu" of evasive actions (4 possible actions) that a user might take depending upon its particular circumstances.

Figure 5:
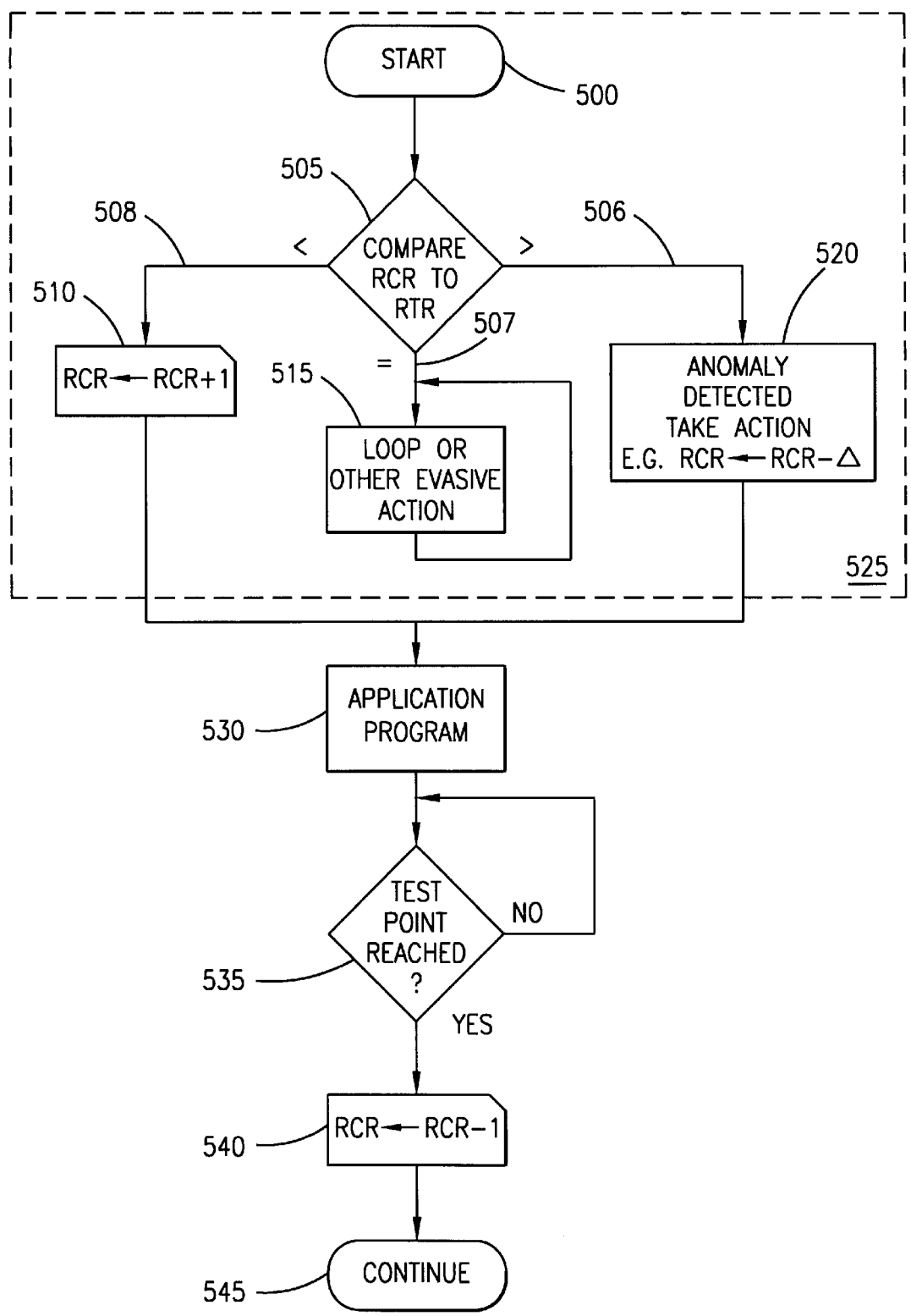
FIG. 5 depicts a flow diagram of an exemplary decision-making process depending upon the contents of at least two reset-associated counters provided in accordance with the teachings of the present invention.

Referring now to FIG. 5, depicted therein is a flow diagram depicting an exemplary decision-making process involving the contents of the RCR 410 and RTR 415 in accordance with the teachings of the present invention. It should be understood that the depicted exemplary decision-making process is also applicable when the functionality of the RCR 410 and RTR 415 are implemented not in separate registers but in other memory addresses as explained hereinabove.

A portion of the decision-making process, labeled with reference numeral 525, involves executing a code residing in the vector RAM block 210. Upon a system start/reset 500, the code compares the values of the RCR 410 and RTR 415 in the decision block 505. Two exemplary methods which may be implemented for establishing initial values in the RCR 410 are as follows. The first method would be to load and execute a simple initialization program that establishes a prespecified value prior to loading the final user application code. This initialization program would preferably do no more than simply clear the RCR 410 (or, a pre-selected memory address, if so embodied) and write a value into it. After loading and running the initialization program, the user would then load the application program, writing over the initialization program, but leaving the pre-selected memory address or the RCR 410 unaltered.

A second method of initializing could be provided from within the final application program by using a special test condition that could be executed by the user's code outside the vector RAM block 210. This initialization would be done immediately after loading and running the application code, upon presenting a user authorization token (for example, a password). This may be done as an added precaution against a reset counter initialization attack in the field. It should be understood that other secure mechanisms to initialize the value in the RCR 410 could also be used, depending upon the system operation and/or hardware implementation.

Continuing to refer to FIG. 5, if the value of the RCR 410 is less than the value of the RTR 415, a path 508 is taken whereby the value of the RCR 410 is incremented by one. This is shown in step 510. If the value of the RCR 410 is equal to the value of the RTR 415, a path 507 is taken which signifies that the system is under attack. Step 515 is a composite step which may involve one or more evasive actions, depending upon how a user might want to respond to an attack. For example, upon entering step 515, a conservative response would be where the system may loop indefinitely in the vector RAM block 210. A more extreme approach would be to completely erase the user application program. Or, in another embodiment, step 515 may be coupled to a menu of more sophisticated actions that may be stored in the ROM block 205, whose execution is dependent upon the b5-b7 bits of the RAR 420. In a still further embodiment, the looping time in the vector RAM block 210 may be made non-linearly dependent upon the number of times a reset is effected by an attacker.

If the value of the RCR 410 is greater than the value of the RTR 415, it may signify a system fault. A path 506 leads to a corrective action 520, for example, where the value of the RCR 410 is decremented by an arbitrary number,Δ. Upon completing either of the steps 510 and 520, the system will execute (step 530) the application program until it reaches a test point therein. Preferably, the test point is deeply "buried" in the application program so that a user may determine with sufficient confidence that the reset was a legitimate and not due to a pirate's attack. By testing the attainment of this point in the decision block 535, the value of the RCR 410 is decremented by one, as provided in step 540. In step 545, the remainder of the application program will be normally executed.

Based upon the foregoing, it can be appreciated that in the exemplary decision-making process uncompensated resets will result from a trial and error attack, which will be compared with a prespecified value of the RTR 415. As stated earlier, it is possible for certain environmental conditions to also produce uncompensated resets which need to be distinguished from the attack-associated resets. Three exemplary conditions are discussed below.

The first condition is a non-cyclic random injection of noise that may cause a processor to lose control. It is generally known that the probability of this non-cyclic noise is typically no more than twice before the application program reaches a suitably selected test point, signifying a decrement in the RCR 410. Therefore, it is possible to distinguish this condition by setting an initial value for the RCR 410 at around 3. However, it should be understood that the actual value ought to be determined by the user-specific conditions of the application.

The second disruptive factor is that of a cyclic nature where the system encounters a rapid set of multiple power-up and power-down conditions due, for example, to input power fluctuations. By monitoring the frequency of the power fluctuations, one may select a system power-on reset time that is longer than the length of a fluctuation episode (that is, a power-up delay in reset). This will provide hardware immunity to incrementing the RCR value when the multiple power fluctuations occur at a rapid rate.

Thirdly, in the case of slow power fluctuations, it is preferred to create a non-linear loop delay before exiting the vector RAM block 210. That is, the system behaves almost as if it is under an attack and takes the path 507 when the RCR 410 equals RTR 415 for the first time and loops for a while within the RAM block 210. It then exits to step 530. The value of the RCR 410 will not change as it gets decremented during the execution of the application program. As the system is reset again, it enters the loop once again, but this time, it will be for longer time. Clearly, in the event that the system is actually under attack, the longer it remains in the vector RAM 210, the better are the odds that the attacker is impeded.

It can be appreciated that in order to reduce the chance that a single reset counter (either a single RCR 410, or a single memory address location) is disrupted by environmental conditions such as those described above, it is possible to provide multiple reset counters and incorporate a voting scheme within the vector RAM 210 to determine if an evasive action is appropriate. Another approach to reduce random disruptions is to focus only on a limited set of values within the reset counter or counters. By limiting the values to a subset of the bits, for example, the three least significant bits, the number of possible (and "illegal") permutations that could be interpreted as being greater than or equal to the threshold value is significantly reduced.

Figure 6:
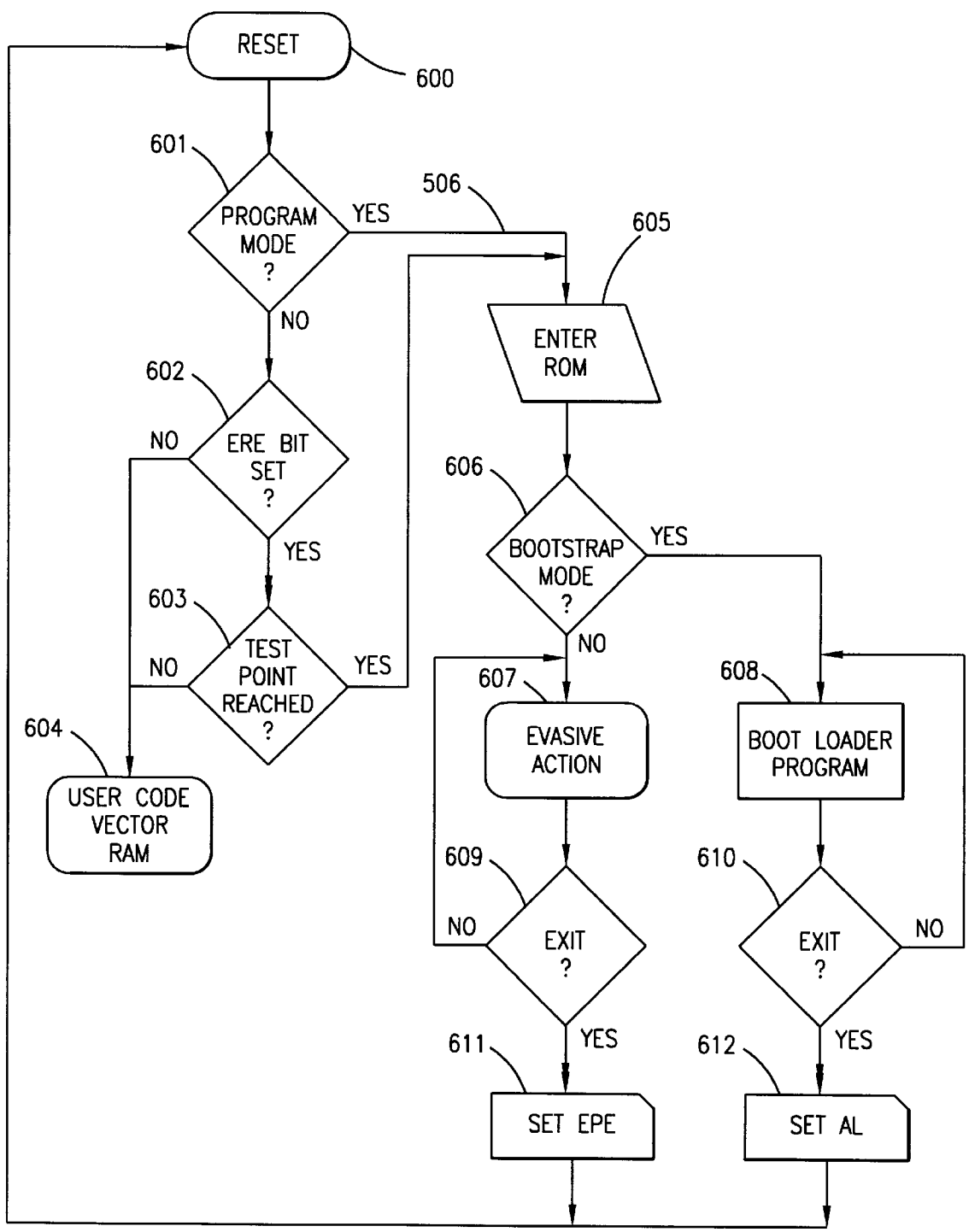
FIG. 6 is an exemplary flow diagram for reset management in a secure microcontroller in accordance with the teachings of the present invention.

Referring now to FIG. 6, an exemplary flow diagram for managing the entry and exit conditions relative to the ROM block 205 is depicted. In a presently preferred embodiment of the enhanced secure microcontroller 400 (shown in FIG. 4), a plurality of conditions in a pre-determined combination control the entry into the ROM block 205, which conditions may include for example, the occurrence of a reset and the status of the ERE bit in the RAR 420. After executing an evasive task which resides in the ROM 205, it is preferred that the controller system vectors off to some location in the vector RAM block 210 to commence the execution of the user application program residing in the memory 130. Since exiting from the ROM block 205 is conditioned by a reset in a presently preferred embodiment, an entry into the ROM block 205 might result in permanent residence therein unless an additional test condition is created prior to entering the ROM block 205. Accordingly, in a presently preferred exemplary embodiment, a machine state (denoted hereinafter by "EXIT PROGRAM ENABLE" or "EPE") is created prior to an entry into the ROM block 205. In accordance with the teachings of the present invention, the EPE state is created by effectuating a timed access read operation on a timed-access-protected register (for example, the RCR 410) such that a latch may be set in response thereto. Clearly, as can be appreciated by those skilled in the art, it is also possible to implement the functionality of the EPE state as a bit in a register in the enhanced secure microcontroller 400. The inter-relationship among these various exit/entry conditions is now immediately described below with specific reference to the steps delineated in the flow diagram shown in FIG. 6.

Upon a reset (step 600), it is determined whether the enhanced secure microcontroller system 400 is in a program mode, as provided in the decision block 601. If the determination obtains an affirmative result, then an entry into the ROM block 205 is effectuated as shown in step 605. Otherwise, a second decision block is entered (decision block 602) to determine if the ERE bit is set. If this determination yields a negative result, then the flow control is transferred to a pre-determined location in the vector RAM block 210, as shown in step 604. Otherwise, a third decision block is entered to determine if the EPE state is clear, as provided in the decision block 603. Again, if this third determination yields a negative result, then the flow control is transferred to a pre-determined location in the vector RAM block 210, as previously described. Otherwise, an entry into the ROM block 205 is effectuated, as provided in step 605.

Still continuing to refer to FIG. 6, upon entering the ROM block 605, a determination is made whether the system is in a bootstrap mode, as provided in the decision block 606. If the system is in the bootstrap mode, then the execution of the bootstrap loader program is commenced, as shown in step 608. After the execution of the bootstrap loader program is completed, as shown in the decision block 610, an "ACCESS LOCK" (AL) bit is set (step 612) before the flow control is transferred by a reset.

On the other hand, if the system is not in the bootstrap mode, then a user-specified evasive action may be triggered as provided in step 607. As described in the foregoing, the contents of the RTR 415 and the RCR 410 may be utilized in addition to the higher-order bits (b5–b6) of the RAR 420 in choosing an appropriate evasive action. It can be appreciated that in extreme cases, a user might wish to disregard the distinction between a legitimate reset and a reset pursuant to an imminent attack, and opt to launch an evasive action such as the erasure of the user application program.

Once the evasive action (for example, non-linear looping of the user application program in the vector RAM 210) is completed, as provided in the decision block 609, the EPE machine state is set (step 611) before the flow control is transferred by a reset. This is done in order to enable the system to vector off to the user application program after coming out of the reset.

Although a preferred embodiment of the method and apparatus of the present invention has been illustrated in the accompanying Drawings and described in the foregoing Detailed Description thereof, it will be understood that the invention is not limited to the embodiments disclosed, but is capable of numerous rearrangements, modifications and substitutions without departing from the spirit of the invention as set forth and defined by the following claims. For example, as mentioned in the foregoing Description, it is possible to practice the present invention with multiple reset counters, either as registers or memory address locations. Other protective measures against an unwarranted attack on an encrypted program may include disabling of all direct memory access (DMA) events which would down-load RAM or ROM data to an external port. It is also more secure to completely avoid the use of direct instructions that write immediate data to ports or a serial output register. This is especially important if the direct write of immediate data is done within a software loop. As can be appreciated, it is possible to detect the change of a port from within a software loop by careful observation. This observation would allow the attacker to insert different values at the perceived immediate data location and make use of the user's software loops to help decrypt the location without requiring numerous resets. Further, the contents of the RCR 410 and the RTR 415 may be used in various ways to determine when a user might want to launch an evasive action depending upon the contents of the RAR 420. Accordingly, it is contemplated herein that these and other modifications are subsumed within the scope of the present invention, claimed hereinbelow.

What is claimed is:

1. A system including a first circuit with an internal bus, said first circuit being capable of communicating with a second circuit via a data bus and an address bus, said second circuit including an external memory block, said system comprising:

a detector for detecting an uncompensated system reset;

means for determining whether said detected uncompensated system reset includes an attacking uncompensated system reset, said means for determining further for determining whether said uncompensated system reset was initiated responsive to an environmental condition, thereby indicating that said uncompensated system reset includes a non-attacking uncompensated system reset;

a storage device connected to said detector, said storage device including a system reset indicator value, wherein said system reset indicator value is indicative of a number of detected attacking uncompensated system resets;

means for incrementing said system reset indicator value included in said storage device responsive to detecting said uncompensated system reset and responsive to determining that said detected uncompensated system reset is said attacking uncompensated system reset;

means for launching an evasive action responsive to said system reset indicator value being equal to or greater than a threshold;

a secure memory block, disposed within said first circuit, said secure memory block being coupled to said internal bus;

an address path encryptor for encrypting signals asserted on said address bus using the contents of a first encryption key, said address path encryptor being coupled to said internal bus;

a data path encryptor for encrypting signals asserted on said data bus using the contents of a second encryption key, said data path encryptor being coupled to said internal bus; and a power input;

wherein said means for determining whether said uncompensated system reset was initiated responsive to an environmental condition comprises:

means for monitoring said power input to determine whether an uncompensated system reset is initiated responsive to a power fluctuation, wherein the power fluctuation is associated with a power fluctuation frequency and wherein said means for monitoring is configured to monitor said power fluctuation frequency.

2. The system as set forth in claim 1, wherein said storage device comprises:

a special function register for storing said system reset indicator value, said special function registered configured such that said system reset indicator value is not altered responsive to the detected uncompensated system reset, wherein said detected uncompensated system reset is a non-attacking uncompensated system reset; and a reset-threshold register, wherein each of said special function register and reset-threshold register is coupled to said internal bus.

3. The system as set forth in claim 2, wherein said means for launching comprises:

means for comparing the system reset indicator value with the contents of said reset-threshold register; and means for effectuating a loop within said secure memory block, said structure for effectuating being responsive to a signal generated by said means for comparing.

4. The system as set forth in claim 2, wherein said means for launching comprises:

an access register, coupled to said internal bus;

means for comparing said system reset indicator value with the contents of said reset-threshold register; and means for erasing the contents of said second circuit, said means for erasing being responsive, at least in part, to the contents of said system reset indicator value.

5. The system including a first circuit with an internal bus, said first circuit being capable of communication with a second circuit via a data bus and an address bus, said second circuit including an external memory block, said system comprising:

a detector for detecting an uncompensated system reset;

means for determining whether said detected uncompensated system reset includes an attacking uncompensated system reset;

a storage device connected to said detector, said storage device including a system reset indicator value, wherein said system reset indicator value is indicative of a number of detected attacking uncompensated system resets;

means for incrementing said system reset indicator value included in said storage device responsive to detecting an uncompensated system reset and respinsive to determining that said detected uncompensated system reset includes said attacking uncompensated system reset; and means for launching an evasive action responsive to said system reset imdicator value reaching a threshold;

a power input;

and further wherein said means for determining whether said uncompensated system reset was initiated responsive to an environmental condition, thereby indicating that said uncompensated system reset includes a non-attacking uncompensated system reset and further wherein said means for determining comprises means for monitoring said power input to determine whether an uncompensated system reset is initiated to a power fluctuation, thereby indicating that said uncompensated system reset includes said non-attacking uncompensated system reset; and wherein said means for monitoring said power input includes:

means for monitoring a frequency of said power fluctuation.

* * * * *

UNITED STATES PATENT AND TRADEMARK OFFICE
CERTIFICATE OF CORRECTION

PATENT NO. : 6,272,637 B1
DATED : August 7, 2001
INVENTOR(S) : Wendell L. Little et al.

It is certified that error appears in the above-identified patent and that said Letters Patent is hereby corrected as shown below:

<u>Title page,</u>
Item [75], insert -- Conrad F. Schlundt, Plano -- after "Coppell,"

<u>Column 14,</u>
Line 7, replace "The" with -- A --
Line 8, replace "communication" with -- communicating --
Line 23, "respinsive" with -- responsive --
Line 28, replace "imdicator" with -- indicator --
Line 39, insert -- responsive -- after "initiated"

Signed and Sealed this

Sixth Day of August, 2002

Attest:

Attesting Officer

JAMES E. ROGAN
*Director of the United States Patent and Trademark Office*